(12) United States Patent
Murphy et al.

(10) Patent No.: US 11,190,271 B1
(45) Date of Patent: Nov. 30, 2021

(54) METHOD OF MONITORING EVENTS IN AN AREA DIVIDED INTO ZONES

(71) Applicant: Network Integrity Systems, Inc., Hickory, NC (US)

(72) Inventors: Cary R. Murphy, Hickory, NC (US); Mark K. Bridges, Hickory, NC (US); Joseph Giovannini, Hickory, NC (US); Don A. Wilson, Jr., Chesapeake, VA (US); Kevin Corey Frazier, Virgina Beach, VA (US)

(73) Assignee: Network Integrity Systems, Inc., Hickory, NC (US)

( * ) Notice: Subject to any disclaimer, the term of this patent is extended or adjusted under 35 U.S.C. 154(b) by 0 days.

(21) Appl. No.: 17/192,091

(22) Filed: Mar. 4, 2021

(51) Int. Cl.
*G01H 9/00* (2006.01)
*H04B 10/079* (2013.01)

(52) U.S. Cl.
CPC ........... *H04B 10/0795* (2013.01); *G01H 9/00* (2013.01); *H04B 10/0793* (2013.01)

(58) Field of Classification Search
CPC .............................. G01H 9/00; H04B 10/0795
See application file for complete search history.

(56) References Cited

U.S. PATENT DOCUMENTS

2007/0280693 A1* 12/2007 Meyer ................ G01D 5/35383
398/79
2012/0297883 A1* 11/2012 Kupershmidt ......... G01H 9/004
73/655

* cited by examiner

*Primary Examiner* — Shi K Li
(74) *Attorney, Agent, or Firm* — Adrian D. Battison; Ade & Company Inc.; Ryan W. Dupuis

(57) ABSTRACT

In a monitoring system using optical fibers, an area to be monitored is divided into zones where each zone has fibers which create a change in a signal transmitted by the fiber in response to an event to be monitored. The fibers all communicate to a common monitoring system having a channel for each zone. The fiber of a second one of the zones communicates to the respective channel of the common monitoring system through a fiber passing through a first one of the zones so that the fiber and thus the second channel is also responsive to an event in the first zone zones. The invention provides a method of distinguishing between the separate zones where events have occurred by a Boolean analysis of the signals in the different channels.

18 Claims, 4 Drawing Sheets

METHOD OF MONITORING EVENTS IN AN AREA DIVIDED INTO ZONES

This application relates to a monitoring system where an area to be monitored is divided into separate zones each communicating with a respective channel of a common monitoring device and for determining which zone an event occurs.

BACKGROUND OF THE INVENTION

The following description relates primarily to optical fibers which are used for many types of monitoring applications, including but not limited to perimeter security, network security, structural monitoring. However the method of the present invention and the analysis by which a particular zone where an event occurs can be used with other elongate transmission elements such as electrically conductive elements where the elongate transmission element is both responsive to the event and acts a transmission component for communicating a signal responsive to the event to a remote monitoring system.

Typically in an optical fiber system, the fiber concerned is monitored using a method which includes transmitting from a source of light at a transmit location a monitor signal along the optical fiber, receiving the monitor signal after transmission along the fiber, analyzing the monitor signal after transmission along the fiber to detect changes therein and generating an alarm in response to the detected changes.

In regard to communications networks, the monitor system is responsive to vibration, motion, or handling of the fiber which are indicative of an intrusion attempt on the fiber.

In addition, the invention herein can be used for fence and buried perimeter protection systems where a fiber is mounted on or at the item to be secured so that again the fiber is monitored for vibration or motion of the fiber caused by attempts to access or penetrate the item concerned.

Yet further, the invention herein can be used for other fibers used for monitoring forces on the fiber caused by strain or other forces that monitor bridge or building integrity. These can include stretching or compression of the fiber. In this case the monitor Is not looking for transverse vibration or movement of the fiber from an intrusion attempt or other handling but is instead looking for changes in the character of the fiber caused by the application of the forces to the fiber. Such arrangement can be used in strain gauges, building and bridge monitoring systems and the like.

Additionally, the invention herein can be used to monitor temperature, strain, and pressure using sensors in wells and down-hole applications. Such methods require a looped fiber to accommodate the inability to place equipment in wells or down holes.

Additionally, the invention herein can be used to monitor fibers distributed throughout a so-called 'smart city" type application. In these instances, fibers are distributed to monitor traffic patterns, weather, electrical distribution, and seismic activity.

In all cases the change in the parameter to be measured causes a change in a characteristic in the fiber which can be measured using known techniques.

One method for monitoring a communications network cable is to use fibers that are internal to the protected cable. This so-called "intrinsic monitoring" is shown in U.S. Pat. No. 7,706,641 issued Apr. 272010 to the present applicant, the disclosure of which is incorporated herein by reference.

The optical fibers can be monitored using a variety of detection techniques including:

Modal metric, where changes in a modal power distribution in a multimode fiber are detected as shown in U.S. Pat. No. 7,092,586 issued Aug. 15, 2006 to the present applicant, the disclosure of which is incorporated herein by reference.

Attenuation, where simply an attenuation in the monitoring signal received is measured.

Polarization monitoring, where changes in a polarization in the signal in a single mode fiber are detected as shown in U.S. Pat. No. 7,142,737 issued Nov. 28, 2006 to the present applicant, the disclosure of which is incorporated herein by reference.

Active fiber monitoring, where monitoring signal and data signal pass on the same fibers as shown in U.S. Pat. No. 7,092,586 issued Aug. 15, 2006 to Vokey et al. and the present applicant, the disclosure of which is incorporated herein by reference.

Strain monitoring such as strain gauge where a Fiber Bragg Grating, strain gauge or DSS monitors a fiber or mechanical structure, disturbance will be stretching or compression Interferometry such as the Mach-Zehnder interferometers used for network and perimeter monitoring.

Each of these methods of monitoring exploit a specific attribute of the fiber—be it loss, rotation of state of polarization, Rayleigh scattering, or others.

In some cases a single fiber is monitored with typically the transmission at one end and the monitoring at the other or same end. However other arrangements can be used in the present invention including for example the loop type network shown for example in U.S. Pat. No. 7,142,737 issued Nov. 28, 2006 to the present applicant, the disclosure of which is incorporated herein by reference.

SUMMARY OF THE INVENTION

According to the present invention there is provided a method for operation of a monitoring system in an area to be monitored comprising:

providing a plurality of elongate transmission elements each of which creates a change in a signal transmitted by the elongate transmission element in response to an event to be monitored;

using a detection system to detect said changes in the signals from the plurality of elongate transmission elements caused by one or more events to be monitored by receiving signals from the respective elongate transmission elements and analyzing the received signals to detect an event to be monitored on the respective elongate transmission element;

wherein the area comprises a plurality of separate zones each having at least one of said elongate transmission elements therein which is responsive to an event in that zone;

wherein each of the elongate transmission elements communicates to a common monitoring system;

the common monitoring system including separate respective monitoring channels each associated with a respective one of the zones;

the elongate transmission element of a second one of the zones communicating to the respective channel of the common monitoring system through an elongate transmission element passing through a first one of the zones;

where the elongate transmission element passing through said first one of the zones is also responsive to an event in said first one of the zones;

so that the respective channel for said second one of the zones is responsive to events in both said second one of the zones and events in said first one of the zones;

and distinguishing between the separate zones where events have occurred by comparing the received signals at the respective channels.

The arrangement herein is primarily for use in optical fiber monitoring systems where one or more of the fibers act as a sensor by a disturbance making changes to a signal through the fiber and one or more of the fibers act to transfer the signals to the common monitoring system. In this way fibers that are used to transfer the signals also can respond to disturbances providing the problem of distinguishing the zones in which the disturbance occurs which is solved by the present arrangement.

However the same solution can be used for other signal conductors such as electrical conductors of a type which respond to disturbances for example by piezoelectric effects.

The arrangement herein thus typically does not require complex locating type monitoring systems which provide both a positive response to a disturbance and an indication of the location along the transmission line or fiber of the disturbance. The arrangement is typically therefore for simple monitoring systems for example of the types mentioned above which do not use location and are hence typically much cheaper.

In a preferred embodiment, the separate zones where events have occurred are distinguished by a Boolean analysis as to which channels receive the received signals.

Preferably the separate zones where events have occurred are distinguished by the Boolean analysis where:

the respective channel for said second zone and the respective channel for the first zone both receive signals, where the event is determined to have occurred in the first zone; and the respective channel for said first zone receives NO signal and the respective channel for the second zone receives a signal, where the event is determined to have occurred in the second zone.

Preferably the separate zones include more than two zones and a determination as to where events have occurred is carried out by a Boolean analysis on the signals received by the plurality of separate channels.

More particularly, the Boolean analysis is preferably as follows

|        | Chan 1 | Chan 2 | Chan 3 | Chan 4 |
|--------|--------|--------|--------|--------|
| Zone 1 | Signal | Signal | Signal | Signal |
| Zone 2 | null   | Signal | Signal | Signal |
| Zone 3 | null   | null   | Signal | Signal |
| Zone 4 | null   | null   | null   | Signal |

In another important feature which can be used, when concurrent or overlapping events occur in the first and second zones, a determination as to which of the plurality of zones the event has occurred is made by an analysis of the amplitude of the signals received by the channels of the respective zones.

More particularly, preferably, a determination is made by an analysis of the amplitude of the signals received by the respective channels of the so that an increased amplitude which is a sum of the amplitudes of signals from two of the zones is indicative of concurrent events in the two zones.

In many cases, the event to be monitored is a disturbance such as motion or vibration of the elongate transmission element or fiber, but other types of disturbances can be monitored by looking for particular effects on the fiber. These can include strain in the fiber, temperature change and many others as are well known.

In a simplest form of the invention, the fibers which act as sensors also act as transfer fibers from the next zones so that each zone has basically one fiber which both senses and transmits from next zones. However, in a more preferred more complex system, at least the first one of the zones includes a plurality of the fibers acting as sensors and where one of the fibers of the plurality is a transmit element used to transmit events from the second zone or further zones. However the transmit fiber is also responsive to the events in its own zone so that both events in its own zone and events in other further zones are transmitted to the monitoring system According to a second aspect of the invention there is provided a method for operation of a monitoring system in an area to be monitored comprising:

providing a plurality of elongate transmission elements each of which creates a change in a signal transmitted by the elongate transmission element in response to an event to be monitored;

using a detection system to detect said changes in the signals from the plurality of elongate transmission elements caused by one or more events to be monitored by receiving signals from the respective elongate transmission elements and analyzing the received signals to detect an event to be monitored on the respective elongate transmission element;

wherein the area comprises a plurality of separate zones each having at least one of said elongate transmission elements therein which is responsive to an event in that zone;

wherein each of the elongate transmission elements communicates to a common monitoring system;

the common monitoring system including separate respective monitoring channels each associated with a respective one of the zones;

the elongate transmission element of at least one of the zones communicating to the respective channel of the common monitoring system through an elongate transmission element passing through at least one other of the zones;

where the elongate transmission element passing through said at least one other of the zones is also responsive to an event in said at least one other of the zones;

so that the respective channel for said at least one other of the zones is responsive to events in both said at least one other of the zones and events in said at least one of the zones;

wherein, when concurrent or overlapping events occur in said zones, a determination as to which of the zones the event has occurred is made by an analysis of the amplitude of the signals received by the channels of the respective zones.

More particularly in a preferred arrangement, a determination is made by an analysis of the amplitude of the signals received by the respective channels of the so that an increased amplitude which is a sum of the amplitudes of signals from two of the zones is indicative of concurrent events in the two zones.

This arrangement thus deals with using multiple monitor fibers in multiple zones, and by evaluating presence, amplitude, and timing of detected disturbances determine the zone in which the disturbance occurs.

In security situations such as fence and perimeter as well as data network and others, it is common practice to use multiple channels of detection equipment to break up the protected asset or area into logical areas known typically as zones. In many installations, these zones are monitored by fiber optic sensors that must traverse some zones in order to monitor others. This need to pass one zone's monitor through another zone offers the potential for false positive reactions.

By analyzing the zones in combination, for binary existence of a disturbance as well as comparing amplitude and arrival time, the monitoring system can discern which zones are truly in alarm. Multiple simultaneous or nearly simultaneous zone alarms can be discriminated.

A challenge occurs when the monitoring system must detect disturbances on multiple zones simultaneously, or in nearly concurrently. In this situation, simultaneous alarms will occur at different amplitudes, and the monitoring system can determine the combination by examining the signals.

DETAILED DESCRIPTION

Figure 1:
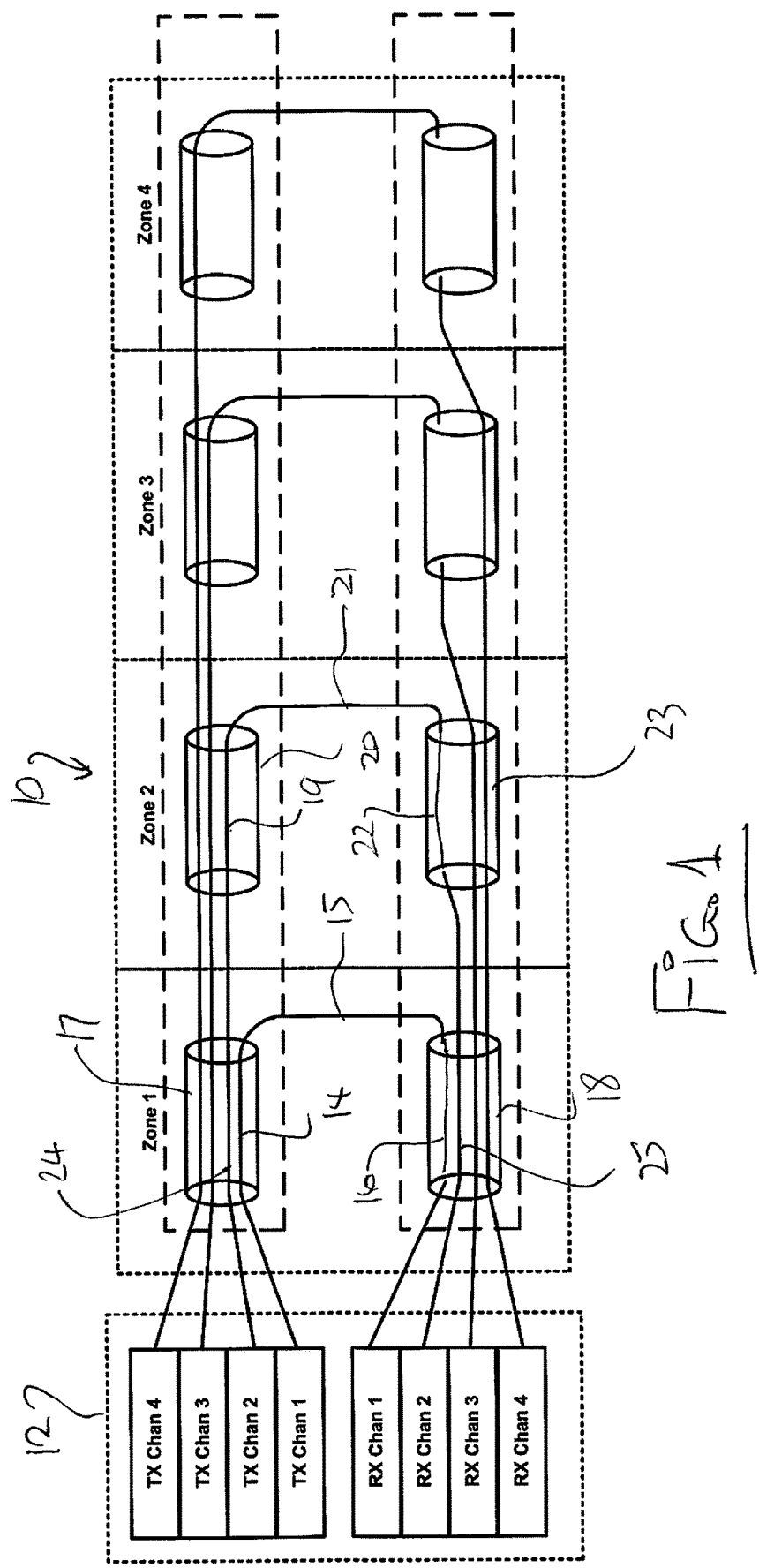
FIG. 1 is a first schematic illustration of an arrangement for monitoring events in an area containing separate zones using optical fibers which are responsive to disturbances in each of the zones.

In FIG. 1 is shown a monitoring arrangement for different zones 1, 2, 3 and 4 of a common area 10 to be monitored. The monitoring arrangement includes a central monitoring device 12 including a plurality of transmit channels TX1 to TX4 transmitting signals along optical fibers and a plurality of receive channels RX1 to RX4 which receive the signals after transmission along the fibers to detect and changes in signal. The common monitoring system therefore includes separate respective monitoring channels each associated with a respective one of the zones. The basic system is well known from the above cited prior documents.

Each of the fibers therefore creates a change in a signal transmitted by the fiber in response to an event to be monitored. The detection system 12 is used to detect the changes in the signals from the plurality of fibers caused by one or more events to be monitored by receiving signals from the respective fiber and analyzing the received signals to detect an event to be monitored on the respective fiber.

The area 10 comprises a plurality of separate zones 1 to 4 each having at least one of the fibers therein which is responsive to an event in that zone. That is in respect of zone 1 there is a transmit fiber 14 which carries the signal from the TX Channel 1 into the zone, a monitoring fiber 15 in the zone and a return fiber 16 which returns the signal from the monitoring fiber to RX channel 1. Transmit fiber 14 is carried in or forms one fiber of a bundle of fibers or sensors 17 and return fiber 16 is carried in a similar bundle of fibers 18. As each of the fibers is responsive to the movement or events in the zone 1, an event on any one of these fibers 14, 15 and 16 will be transmitted to the RX channel 1. This provides a loop-back of the fibers in each zone where the signal on the transmit fiber is returned through the sensor fiber to the return fiber.

In regard to zone 2, in the zone there is a transmit fiber 19 as part of a cable 20, a monitoring fiber 21 and a return fiber 22 passes through a cable 23 from TX channel 2 to RX channel 2. Thus fibers 19, 21 and 22 are responsive to events in zone 2. It will be noted also that transmit fiber 19 connects to a fiber 24 which passes though zone 1 in cable 17 and return fiber 22 connects to a fiber 25 which passes through zone 1 in cable 18. Thus the RX channel 2 will also receive signals due to movement or events in zone 1 as the fibers 24 and 25 are also responsive to events in zone 1. Symmetrically the further zones 3 and 4 includes transmit, monitoring and return fibers which pass through the cables 20 and 23 of zone 2 and the cables 17 and 18 of zone 1 so again are responsive to events in zone 3 or 4 but also are responsive to events in zone 1, zone 2 and zone 3.

Thus the fibers of a second one of the zones which is zone 2 communicate to the respective channel RX2 of the common monitoring system through the fiber passing through zone 1 and the fiber passing through the second zone is also responsive to an event in said first one of the zones. In this way the respective channel RX2 for the second zone is responsive to events in both the first and second zones.

In the arrangement of the present invention an analysis is made distinguishing between the separate zones where events have occurred by comparing the received signals at the respective channels RX1 and RX2. In this way there is no need for use of a more expensive system which provides locating information by analysis of the signals received.

Figure 2:
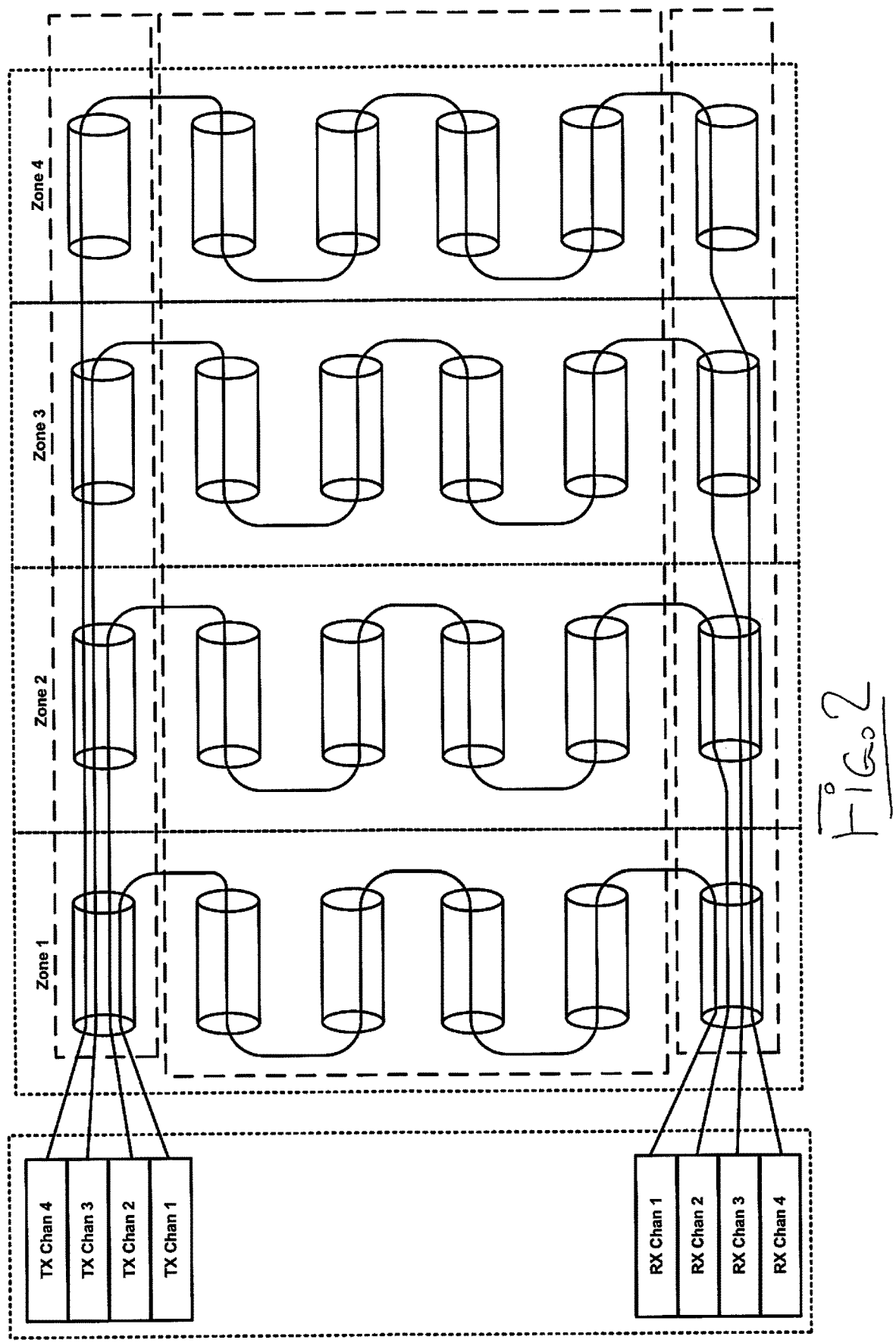
FIG. 2 is a second schematic illustration of an arrangement for monitoring events in an area containing separate zones using optical fibers which are responsive to disturbances in each of the zones.

In FIG. 2, the arrangement is more complicated in that each zone includes a series of monitoring fibers deployed at suitable locations within the zone. As in FIG. 1, however the individual monitoring fibers in each zone must pass through previous zones in the path back to the monitoring system 12 so that again a disturbance or event on zone 1 will be seen by all the channels and an event in zone 2 will be seen by channels 2, 3 and 4.

In particular the separate zones where events have occurred are distinguished by a Boolean analysis as to which channels receive the received signals. In the Boolean analysis where the respective channel for the second zone and the respective channel for the first zone both receive signals, the event is determined to have occurred in the first zone. In the Boolean analysis, where the respective channel for the first zone receives NO signal and the respective channel for the second zone receives a signal, the event is determined to have occurred in the second zone.

Thus Boolean analysis is as follows

|        | Chan 1 | Chan 2 | Chan 3 | Chan 4 |
|--------|--------|--------|--------|--------|
| Zone 1 | Signal | Signal | Signal | Signal |
| Zone 2 | null   | Signal | Signal | Signal |
| Zone 3 | null   | null   | Signal | Signal |
| Zone 4 | null   | null   | null   | Signal |

Figure 3:
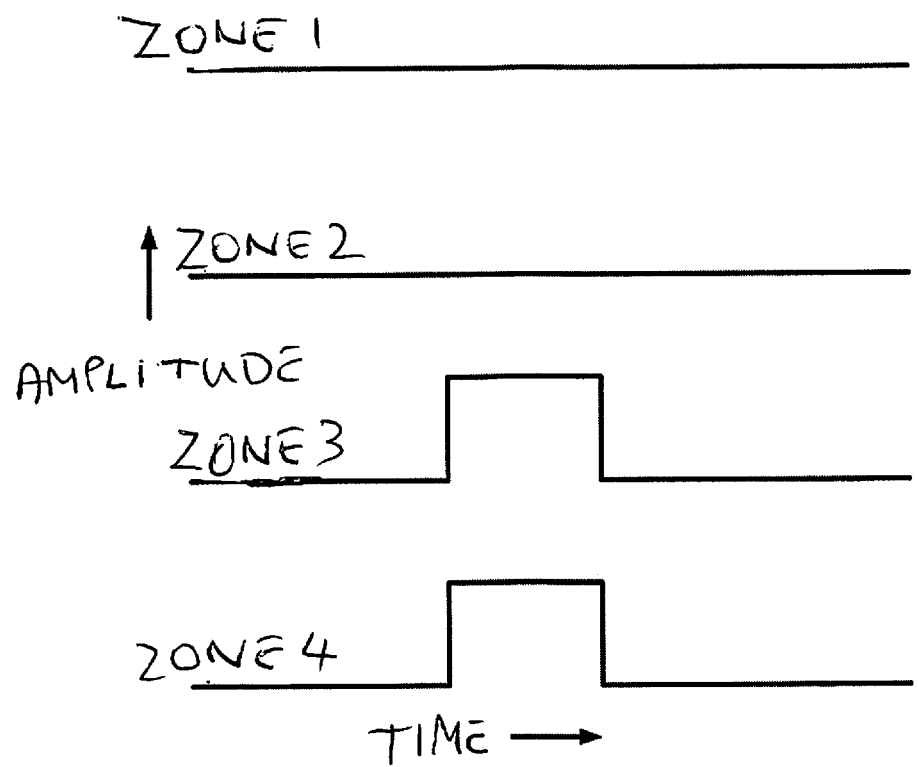
FIG. 3 is a first trace showing as one example the signals from the four separate channels of the monitoring system in response to an event in zone 3.

Thus FIG. 3 shows one example of this where a disturbance in Zone 3 will not be detected in zones 1 or 2 as shown but will appear as a disturbance on both zones 3 and 4 as set forth above.

Figure 4:
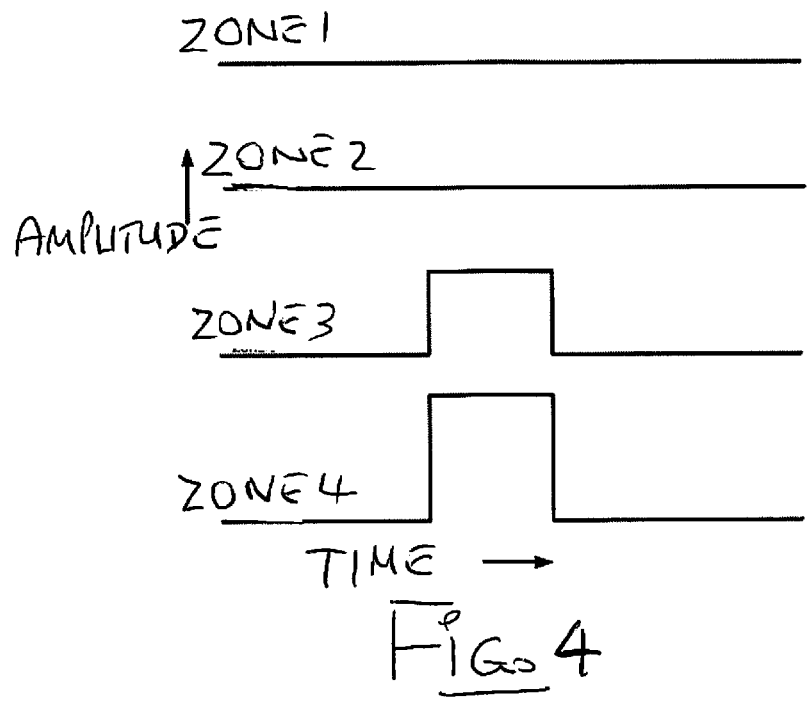
FIG. 4 is a second trace showing the signals from the four separate channels of the monitoring system in response to simultaneous events in zones 3 and 4.
Figure 5:
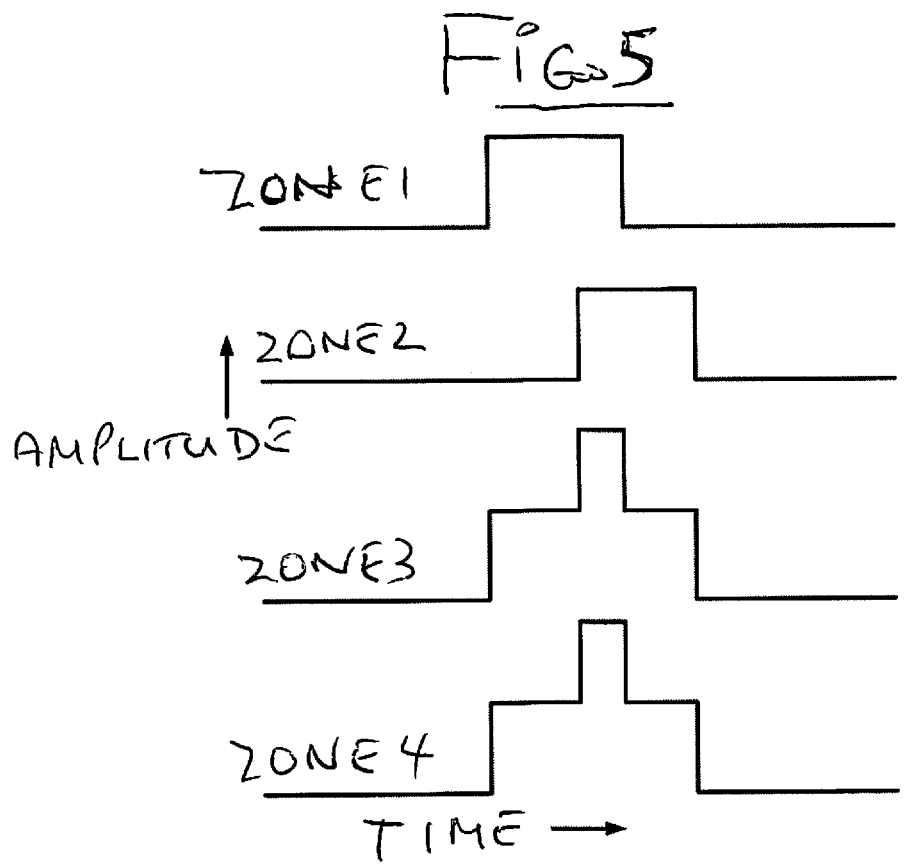
FIG. 5 is a third trace showing the signals from the separate channels of the monitoring system in the situation where the disturbances are not concurrent, yet are too closely timed such that they are not individually detected, analysis of the envelope of the disturbances allow differentiation of the events.

Turning now to FIGS. 4 and 5 it is shown that, when concurrent or overlapping events occur in the first and second zones, a determination as to which of the plurality of zones the event has occurred is made by an analysis of the amplitude of the signals received by the channels of the respective zones.

In particular in FIG. 4, simultaneous disturbances in zones 3 and 4 will cause channels 3 and 4 to detect the zone 3 alarm, while the increase magnitude in channel 4 illustrates a simultaneous disturbance in that zone.

That is a determination is made by an analysis of the amplitude of the signals received by the respective channels of the so that an increased amplitude which is a sum of the amplitudes of signals from two of the zones is indicative of concurrent events in the two zones.

In the situation shown in FIG. 5 where the disturbances are not concurrent, yet are too closely timed such that they are not individually detected, analysis of the envelope of the disturbances allow differentiation of the events.

Thus as is clear from the above, the analysis of single events in one zone is based on the concept that, where the event to be monitored appears equally in multiple zones simultaneously, the actual location is the first zone in sequence.

Thus as is clear from the above, the analysis of simultaneous or overlapping events is based on the concept that, where the event to be monitored appears unequally in multiple zones simultaneously, the actual location of the first disturbance is the first zone in sequence and the actual location of subsequent disturbances is the first zone in sequence with an increased amplitude.

Thus as is clear from the above, the analysis is based on the concept that, where the event to be monitored appears equally in multiple zones non-simultaneously, the actual location is the first zone in sequence in which the disturbance envelope indicates an increase of amplitude during the initial event.

In order to set up the arrangement of the present invention where the monitoring of the individual zones can provide an analysis of which zone is in disturbance, the outside plant configuration preferably has the following features:

Two trunk conduits (transmit and receive) to support alarming multiple pipes within a segment.

The trunk conduits require a higher strand count to support all alarmed zones.

All other conduits will require a single dark strand of fiber to create an alarmed sensor throughout the conduit.

The loopback location in each zone has a fiber optic splice case located within it for zone configuration and splicing.

The transmit fiber splices into the (1) dark strand, within each conduit, in a daisy chain configuration.

At the end of the daisy chain, the single strand of fiber is spliced into the receive trunk fiber.

The transmit and receive fiber trunks utilize the above stated Boolean logic to determine which segment is receiving an intrusion so that the remaining conduits alarm independently of the trunk fibers and indicate the exact segment the intrusion is taking place.

The invention claimed is:

1. A method for operation of a monitoring system in an area to be monitored comprising:
   providing a plurality of elongate transmission elements each of which creates a change in a signal transmitted by the elongate transmission element in response to an event to be monitored;
   using a detection system to detect said changes in the signals from the plurality of elongate transmission elements caused by one or more events to be monitored by receiving signals from the respective elongate transmission elements and analyzing the received signals to detect an event to be monitored on the respective elongate transmission element;
   wherein the area comprises a plurality of separate zones each having at least one of said elongate transmission elements therein which is responsive to an event in that zone;
   wherein each of the elongate transmission elements communicates to a common monitoring system;
   the common monitoring system including separate respective monitoring channels each associated with a respective one of the zones;
   the elongate transmission element of a second one of the zones communicating to the respective channel of the common monitoring system through an elongate transmission element passing through a first one of the zones;
   where the elongate transmission element passing through said first one of the zones is also responsive to an event in said first one of the zones;
   so that the respective channel for said second one of the zones is responsive to events in both said second one of the zones and events in said first one of the zones;
   and distinguishing between the separate zones where events have occurred by comparing the received signals at the respective channels.

2. The method according to claim 1 wherein the separate zones where events have occurred are distinguished by a Boolean analysis as to which channels receive the received signals.

3. The method according to claim 2 wherein the separate zones where events have occurred are distinguished by the Boolean analysis where:
   the respective channel for said second zone and the respective channel for the first zone both receive signals, where the event is determined to have occurred in the first zone; and
   the respective channel for said first zone receives NO signal and the respective channel for the second zone receives a signal, where the event is determined to have occurred in the second zone.

4. The method according to claim 2 wherein the separate zones include more than two zones and a determination as to where events have occurred is carried out by a Boolean analysis on the signals received by the plurality of separate channels.

5. The method according to claim 2 wherein Boolean analysis is as follows

|  | Chan 1 | Chan 2 | Chan 3 | Chan 4 |
| --- | --- | --- | --- | --- |
| Zone 1 | Signal | Signal | Signal | Signal |
| Zone 2 | null | Signal | Signal | Signal |
| Zone 3 | null | null | Signal | Signal |
| Zone 4 | null | null | null | Signal. |

6. The method according to claim 1 wherein, when concurrent or overlapping events occur in the first and second zones, a determination as to which of the plurality of zones the event has occurred is made by an analysis of the amplitude of the signals received by the channels of the respective zones.

7. The method according to claim 6 wherein a determination is made by an analysis of the amplitude of the signals received by the respective channels of the so that an increased amplitude which is a sum of the amplitudes of signals from two of the zones is indicative of concurrent events in the two zones.

8. The method according to claim 1 wherein the analysis is based on the concept that, where the event to be monitored appears equally in multiple zones simultaneously, the actual location is the first zone in sequence.

9. The method according to claim 1 wherein the analysis is based on the concept that, where the event to be monitored appears unequally in multiple zones simultaneously, the actual location of the first disturbance is the first zone in sequence and the actual location of subsequent disturbances is the first zone in sequence with an increased amplitude.

10. The method according to claim 1 wherein the analysis is based on the concept that, where the event to be monitored appears equally in multiple zones non-simultaneously, the actual location is the first zone in sequence in which the disturbance envelope indicates an increase of amplitude during the initial event.

11. The method according to claim 1 where the event to be monitored is a disturbance such as motion or vibration of the elongate transmission element.

12. The method according to claim 1 where the event to be monitored is a disturbance such as strain in the elongate transmission element.

13. The method according to claim 1 where the event to be monitored is a disturbance in the elongate transmission element such as temperature change.

14. The method according to claim 1 wherein at least the first one of the zones includes a plurality of the elongate transmission elements where one of the elongate transmission element of the plurality is a transmit element used to transmit events from the second zone.

15. The method according to claim 14 where events in the transfer element report multiple events while events in the others of the plurality report events alone.

16. The method according to claim 1 where the elongate transmission elements comprise optical fibers.

17. A method for operation of a monitoring system in an area to be monitored comprising:

providing a plurality of elongate transmission elements each of which creates a change in a signal transmitted by the elongate transmission element in response to an event to be monitored;

using a detection system to detect said changes in the signals from the plurality of elongate transmission elements caused by one or more events to be monitored by receiving signals from the respective elongate transmission elements and analyzing the received signals to detect an event to be monitored on the respective elongate transmission element;

wherein the area comprises a plurality of separate zones each having at least one of said elongate transmission elements therein which is responsive to an event in that zone;

wherein each of the elongate transmission elements communicates to a common monitoring system;

the common monitoring system including separate respective monitoring channels each associated with a respective one of the zones;

the elongate transmission element of at least one of the zones communicating to the respective channel of the common monitoring system through an elongate transmission element passing through at least one other of the zones;

where the elongate transmission element passing through said at least one other of the zones is also responsive to an event in said at least one other of the zones;

so that the respective channel for said at least one other of the zones is responsive to events in both said at least one other of the zones and events in said at least one of the zones;

wherein, when concurrent or overlapping events occur in said zones, a determination as to which of the zones the event has occurred is made by an analysis of the amplitude of the signals received by the channels of the respective zones.

18. The method according to claim 17 wherein a determination is made by an analysis of the amplitude of the signals received by the respective channels of the so that an increased amplitude which is a sum of the amplitudes of signals from two of the zones is indicative of concurrent events in the two zones.

* * * * *